United States Patent
Binek et al.

(10) Patent No.: US 12,270,543 B2
(45) Date of Patent: Apr. 8, 2025

(54) MULTI-FUNCTION MONOLITHIC COMBUSTION LINER

(71) Applicant: Raytheon Technologies Corporation, Farmington, CT (US)

(72) Inventors: Lawrence A. Binek, East Hartford, CT (US); Sean R. Jackson, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/408,049

(22) Filed: Aug. 20, 2021

(65) Prior Publication Data
US 2023/0055939 A1 Feb. 23, 2023

(51) Int. Cl.
F23R 3/28 (2006.01)
F02C 7/224 (2006.01)
F23R 3/00 (2006.01)
F23R 3/34 (2006.01)

(52) U.S. Cl.
CPC .............. *F23R 3/002* (2013.01); *F02C 7/224* (2013.01); *F23R 3/28* (2013.01); *F23R 3/283* (2013.01); *F23R 3/34* (2013.01)

(58) Field of Classification Search
CPC .. F23R 3/002; F23R 3/34; F23R 3/283; F23R 3/28; F23R 3/346
See application file for complete search history.

(56) References Cited

U.S. PATENT DOCUMENTS

| | | | |
|---|---|---|---|
| 5,063,745 A * | 11/1991 | Shekleton | F23R 3/28 60/737 |
| 5,177,955 A | 1/1993 | Shekleton | |
| 9,316,155 B2 | 4/2016 | Dicintio et al. | |
| 10,584,638 B2 | 3/2020 | Berry et al. | |
| 10,830,442 B2 | 11/2020 | Berry et al. | |
| 2005/0155224 A1* | 7/2005 | Thompson | F02M 55/02 29/890.02 |
| 2010/0071376 A1* | 3/2010 | Wiebe | F23R 3/346 60/740 |
| 2010/0236252 A1* | 9/2010 | Huth | F23R 3/14 60/748 |
| 2011/0067402 A1* | 3/2011 | Wiebe | F23R 3/46 60/740 |
| 2012/0304648 A1* | 12/2012 | Byrne | F23R 3/06 60/737 |
| 2012/0304652 A1* | 12/2012 | Crawley | F23R 3/346 60/740 |
| 2013/0025287 A1* | 1/2013 | Cunha | F23R 3/06 60/752 |
| 2013/0239575 A1* | 9/2013 | Chen | F23R 3/286 60/747 |
| 2016/0123596 A1* | 5/2016 | Hoke | F23R 3/06 60/746 |
| 2016/0230993 A1* | 8/2016 | Dai | F23R 3/06 |

(Continued)

*Primary Examiner* — Arun Goyal
(74) *Attorney, Agent, or Firm* — Kinney & Lange, P. A.

(57) ABSTRACT

A monolithic combustion liner for use in a gas turbine engine includes fuel channels integrated into the wall of the combustion liner. The integrated fuel channels can have an aerodynamic shape to reduce flow losses of cooling air flowing around the exterior of the combustion liner. The monolithic combustion liner allows more cooling air to flow around the combustion liner, increasing the cooling of the combustor region of the gas-turbine engine.

19 Claims, 6 Drawing Sheets

(56) References Cited

U.S. PATENT DOCUMENTS

| | | |
|---|---|---|
| 2016/0281992 A1 | 9/2016 | Dicintio et al. |
| 2019/0107284 A1* | 4/2019 | Seo .................. F23R 3/286 |
| 2019/0128521 A1* | 5/2019 | Han .................. F02C 7/222 |

* cited by examiner

US 12,270,543 B2

MULTI-FUNCTION MONOLITHIC COMBUSTION LINER

BACKGROUND

The present invention relates to combustion liners for use in gas turbine engines and, more particularly, to multi-function monolithic combustion liners for use in gas turbine engines.

Gas turbine engines are continuous combustion engines that can be used for various purposes, such as power generation and/or producing thrust in an aircraft. Gas turbine engines include one or more compressor sections, one or more combustor sections, and one or more turbine sections. The compressor section receives and compresses air to increase the pressure of the air before the air reaches the combustor section. The combustor section receives the high-pressure air, mixes the high-pressure air with a fuel, and ignites the fuel and air mixture to produce exhaust gases. The exhaust gases flow from the combustor section to the turbine section where energy is extracted from the exhaust gases for use by the gas turbine engine. Further, the combustor section of the gas turbine engine can include a combustion chamber, a combustion liner, and a fuel manifold. The combustion liner can be positioned within the combustion chamber and the fuel manifold can be utilized to inject fuel into the combustion liner. Three common configurations for the combustor section of the gas turbine engine are an annular combustor, a can combustor, and a can-annular combustor.

In one example in which the combustor section is an annular combustor, the fuel manifold can be a circular tube that is positioned outside the combustion liner and coupled to the combustion liner through a plurality of brackets secured to an outer surface of the combustion liner. As such, the fuel manifold is positioned within the volume between the outer surface of the combustion liner and the inner surface of the combustion chamber. This volume is utilized as a cooling flow path for air to flow and cool the combustion liner. The fuel manifold and the brackets are positioned within the cooling flow path and therefore disrupt cooling air as it traverses the outer surface of the combustion liner. This disruption of cooling air causes less surface cooling and increased temperatures of the combustion liner, potentially damaging the combustion liner during operation of the gas turbine engine. Thus, there is a need to achieve a suitable fuel distribution to the combustor while providing adequate cooling of the combustion liner to extend the parts life and improve performance of the gas turbine engine.

SUMMARY

According to one aspect of the disclosure, a combustion liner for use in a gas turbine engine is disclosed. The combustion liner includes an inner wall, an outer wall, a dome, a fuel channel, and a nozzle. The outer wall is spaced radially outward from the inner wall. The dome extends between and couples the inner wall to the outer wall. The fuel channel is formed as a single piece with the outer wall. A first distal end of the fuel channel receives fuel from a fuel source. The nozzle is positioned at a second distal end of the fuel channel and the nozzle is fluidly coupled to the fuel channel.

According to another aspect of the disclosure, a method of using a combustion liner in a gas turbine engine is disclosed. The method includes injecting fuel from a fuel source into a fuel channel, wherein the fuel channel is formed as a single piece with an outer wall of the combustion liner; flowing the fuel from a first distal end to a second distal end of the fuel channel, wherein the fuel is pre-heated as the fuel flows through the fuel channel; dispensing the pre-heated fuel through a nozzle into a dilution chute; and flowing the pre-heated fuel through the dilution chute into an interior of the combustion liner.

DETAILED DESCRIPTION

Figure 1A:
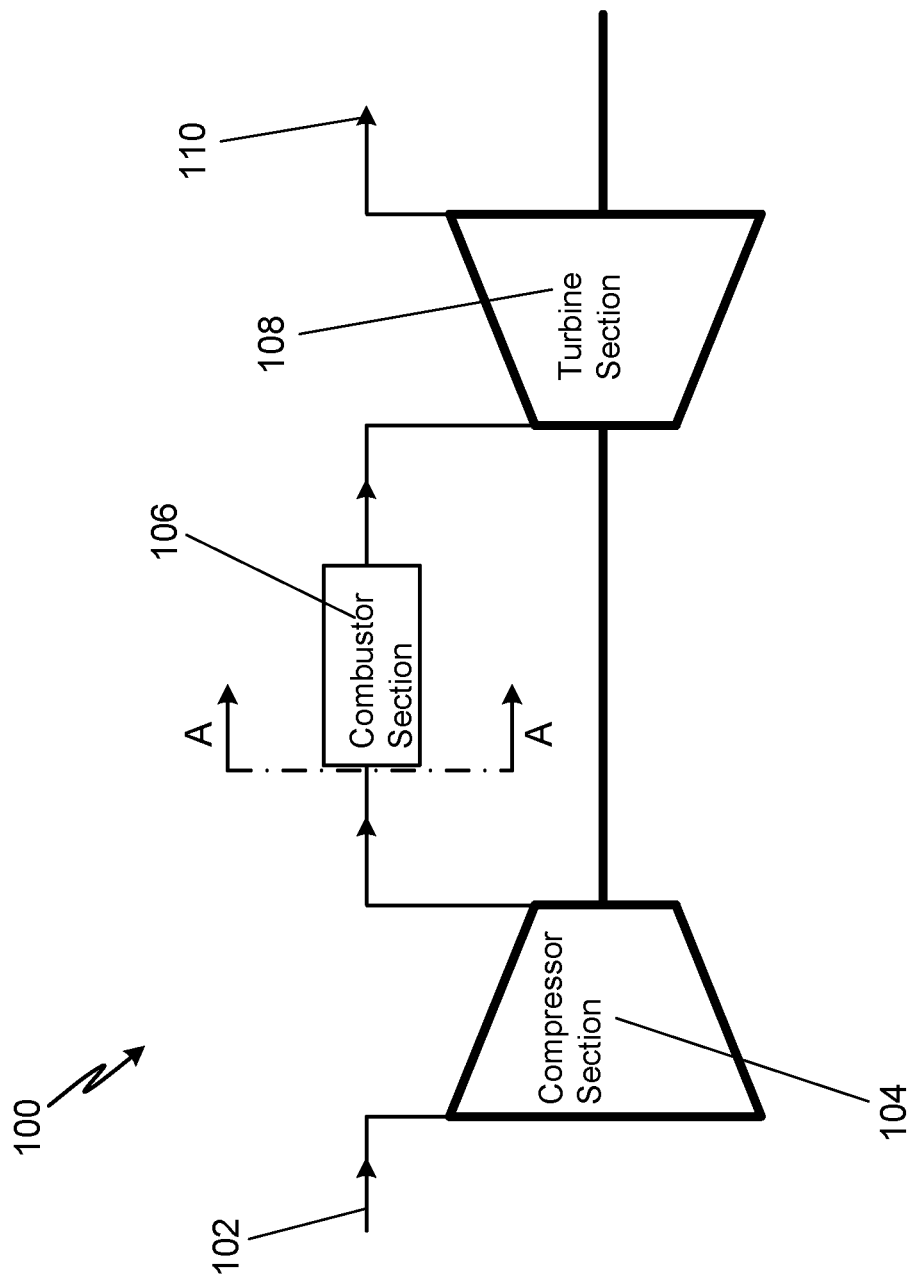
FIG. 1A is a schematic diagram of a portion of a gas turbine engine.

FIG. 1A is a schematic diagram of a portion of gas turbine engine 100. As shown in FIG. 1A, gas turbine engine 100 includes air input 102, compressor section 104, combustor section 106, turbine section 108, and exhaust nozzle 110. Compressor section 104 is positioned on the upstream end of gas turbine engine 100, with respect to airflow through gas turbine engine 100. Compressor section 104 is configured to receive low-pressure air from air input 102, compress the low-pressure air to increase the pressure of the low-pressure air, and then transfer the compressed high-pressure air to combustor section 106. Combustor section 106 receives the high-pressure air, mixes the high-pressure air with a fuel, and ignites the fuel and air mixture to produce exhaust gases. The exhaust gases flow from combustor section 106 to turbine section 108 where energy is extracted from the exhaust gases for use by gas turbine engine 100. The exhaust gases continue to flow downstream through gas turbine engine 100 to exhaust nozzle 110, where the exhaust gases are accelerated and expelled from gas turbine engine 100.

Figure 1B:
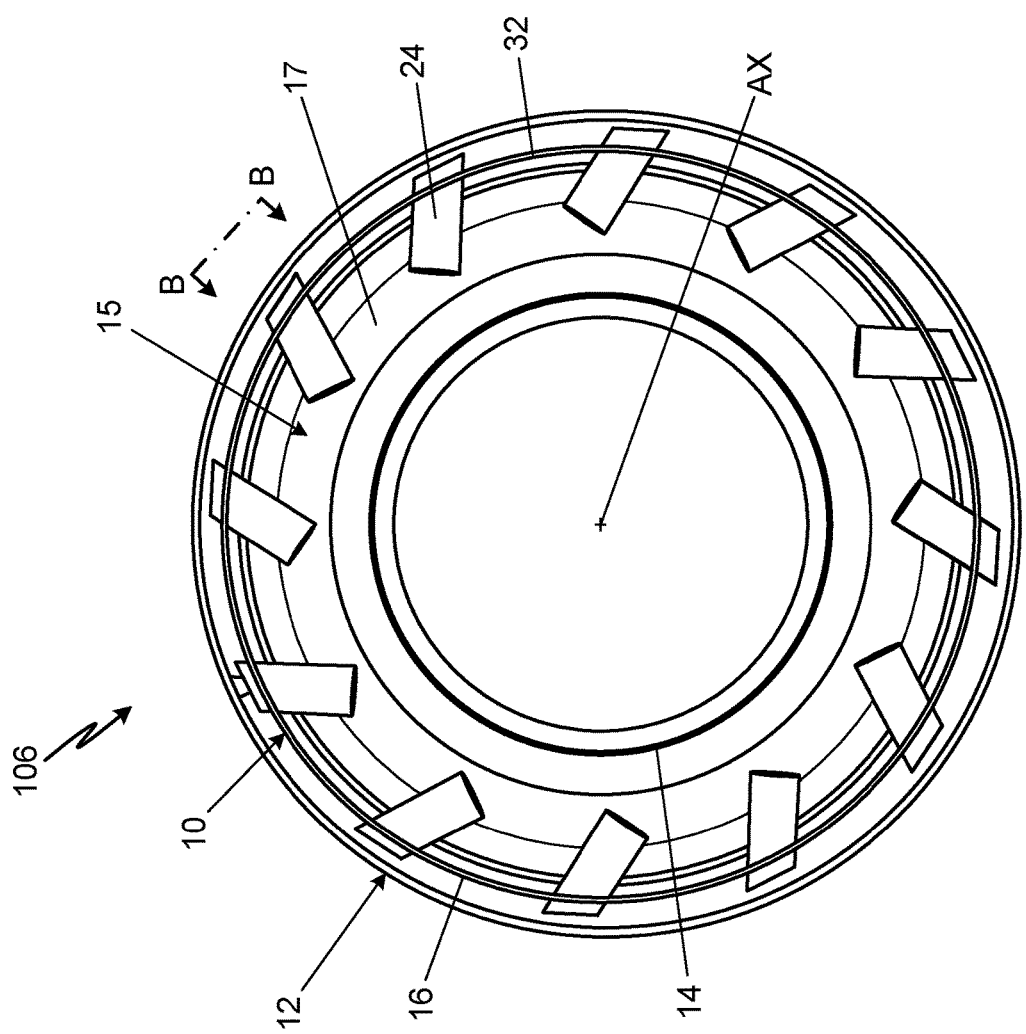
FIG. 1B is a front view of a representative monolithic combustion liner taken along section line A-A of FIG. 1A.

FIG. 1B is a front view of combustor section 106 taken along section line A-A of FIG. 1A. As shown in FIG. 1B, combustor section 106 includes combustion liner 10 and combustion chamber 12, which are used in gas turbine engine 100. Combustion liner 10 is a component of a gas turbine engine that fits within and is secured to combustion chamber 12 of gas turbine engine 100. Combustion liner 10 is configured to receive a fuel and air mixture and provide a location in which the fuel and air mixture is ignited within gas turbine engine 100. As such, combustion liner 10 must be capable of withstanding high temperatures, without damage, during operation of gas turbine engine 100. To prevent damage to combustion liner 10, cooling air flows in the volume between combustion liner 10 and combustion chamber 12, removing heat from combustion liner 10 as the cooling air traverses combustion liner 10. The cooling air flows in axial direction AX, which is the central axis of combustion liner 10, to remove heat from combustion liner 10. Reducing cooling losses, by increasing cooling air flow through the volume between combustion liner 10 and combustion chamber 12, extends the useful life of combustion liner 10 and improves the overall performance of gas turbine engine 100.

Combustion liner 10 includes inner wall 14, outer wall 16, and dome 17, which are the main body portions of combustion liner 10. Inner wall 14 and outer wall 16 are coupled together through dome 17, which extends between and couples inner wall 14 to outer wall 16. Inner wall 14 is the innermost structure of combustion liner 10. Inner wall 14 has a circular cross section when viewing in axial direction AX. Outer wall 16 is spaced radially outward from inner wall 14, with respect to axial direction AX. Outer wall 16 has a circular cross section when viewing in axial direction AX, and outer wall 16 is concentric about inner wall 14. The space between inner wall 14 and outer wall 16 is interior 15 of combustion liner 10. Interior 15 is the portion of combustion liner 10 that receives high-pressure air and fuel and provides a location for the high-pressure air and fuel to mix before combustion, discussed further below.

Figure 2A:
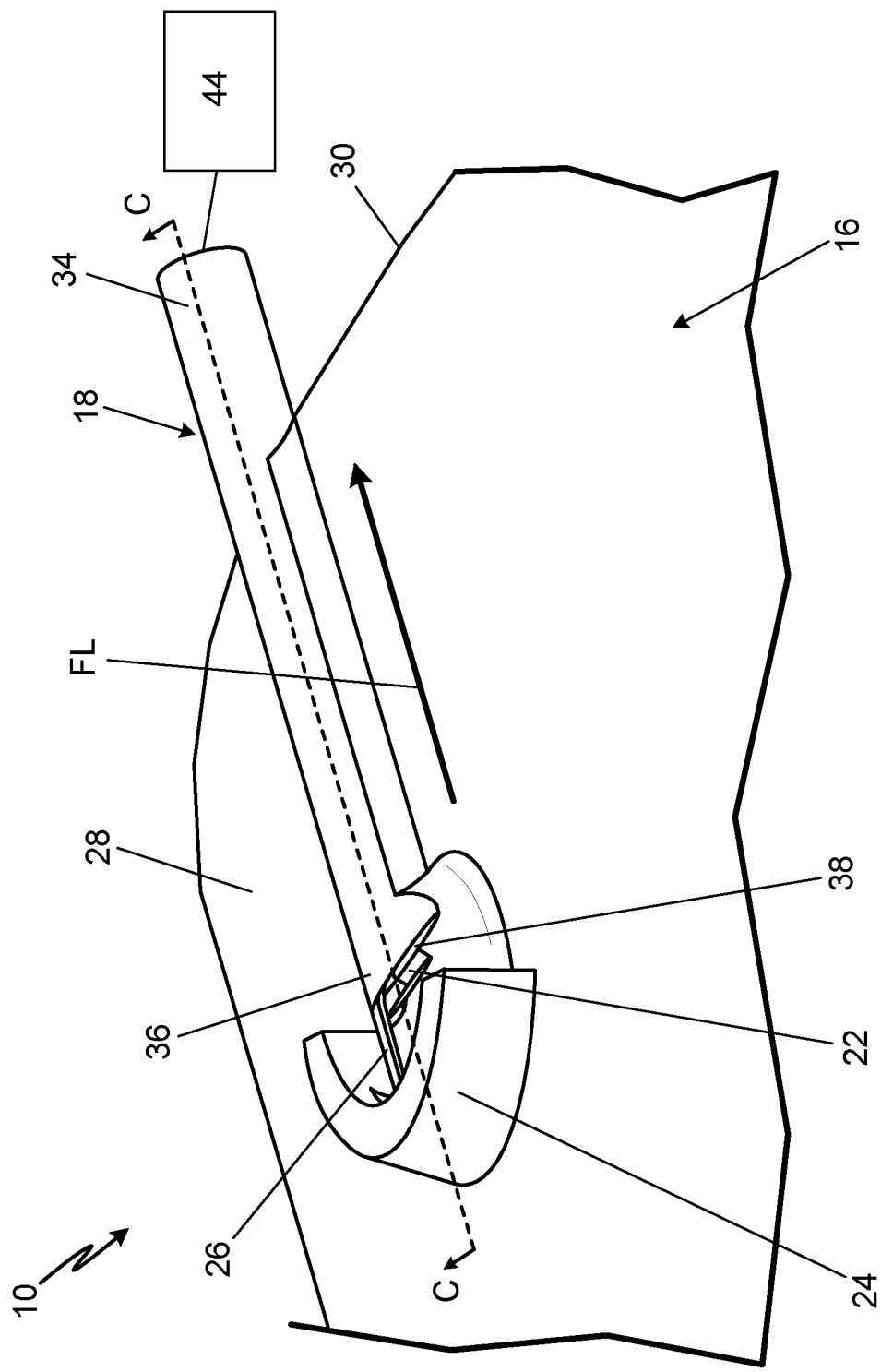
FIG. 2A is a perspective view of a portion of the monolithic combustion liner of FIG. 1 taken along section line B-B of FIG. 1B.
Figure 2B:
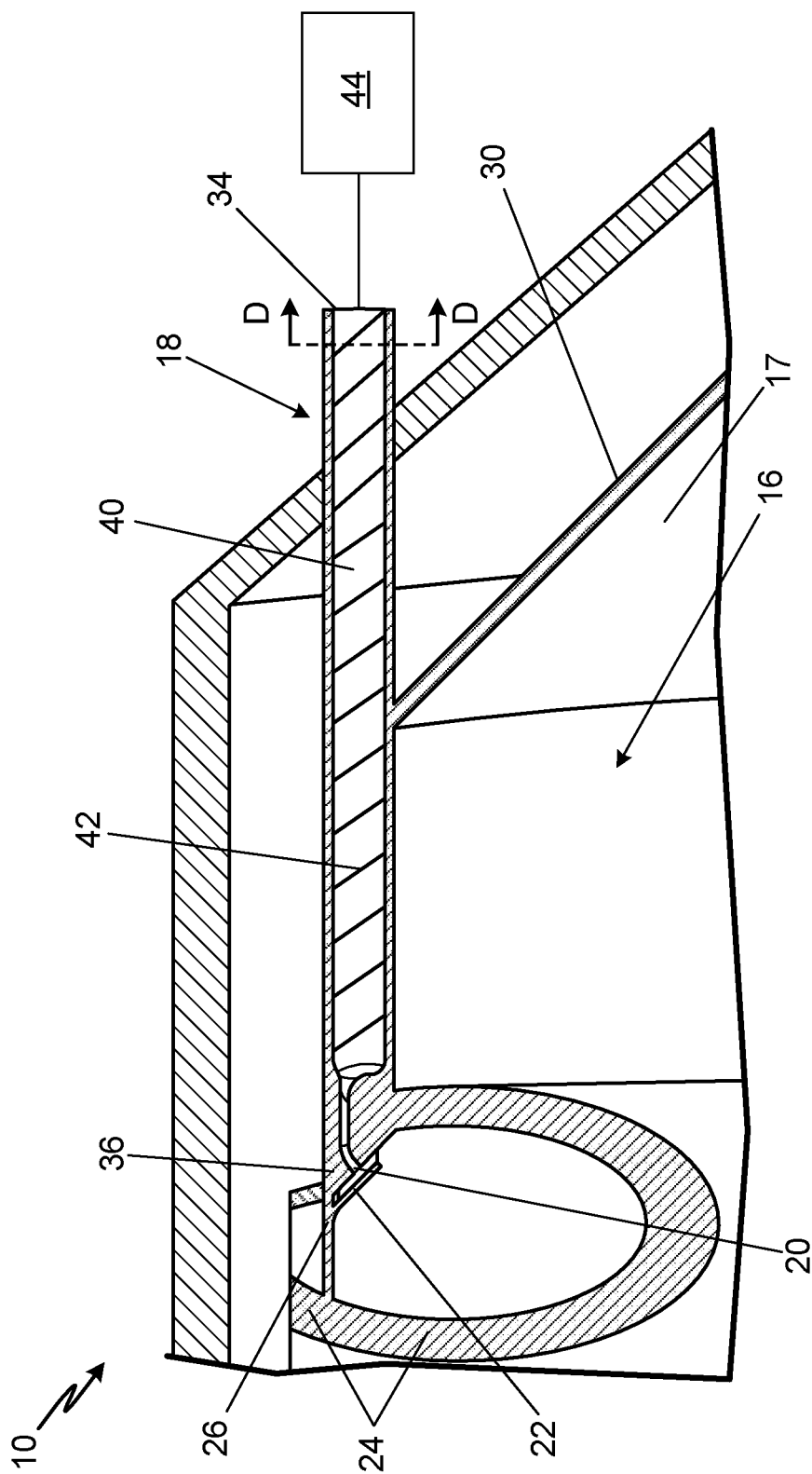
FIG. 2B is a cross-sectional view of a fuel channel of the monolithic combustion liner taken along section line C-C of FIG. 2A.
Figure 2C:
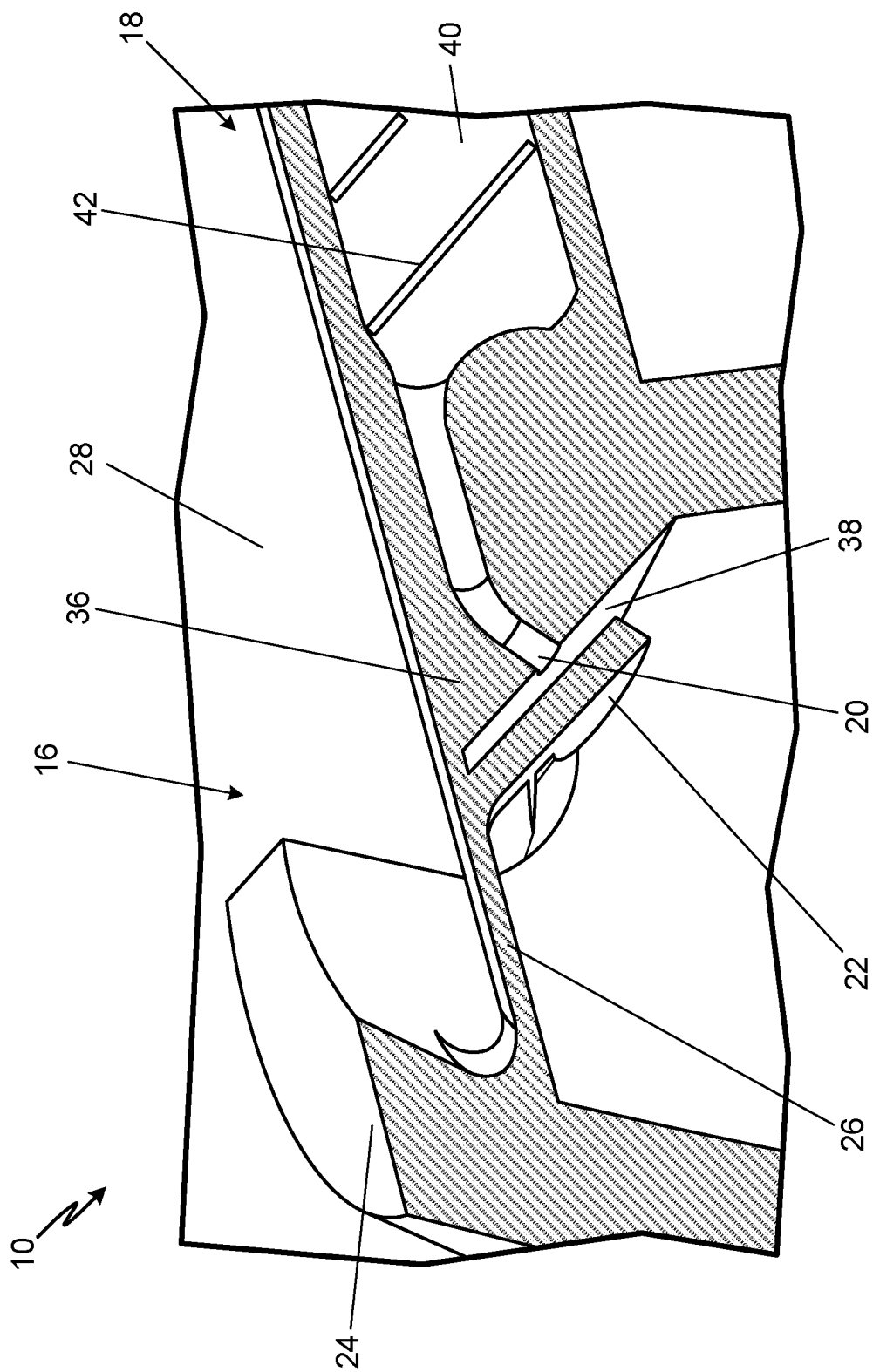
FIG. 2C is a close-up cross-sectional view of a portion of the fuel channel of FIG. 2B.

FIG. 2A is a perspective view of a portion of combustion liner 10 taken along section line B-B of FIG. 1B with combustion chamber 12 removed. FIG. 2B is a cross-sectional view of fuel channel 18 of combustion liner 10 taken along section line C-C of FIG. 2A. FIG. 2C is a close-up cross-sectional view of a portion of fuel channel 18. FIGS. 2A-2C will be discussed together. Combustion liner 10 includes inner wall 14, outer wall 16, fuel channel 18, nozzle 20, splash plate 22, dilution chute 24, and support root 26. Outer wall 16 includes outer surface 28, first end face 30, and second end face 32 (see FIG. 1). Outer surface 28 is the outermost surface along the outermost circumference of outer wall 16. First end face 30 is the aft most surface of outer wall 16 and combustion liner 10, with respect to flow direction FL of cooling air over combustion liner 10. Second end face 32 is the forward most surface of outer wall 16 and combustion liner 10, with respect to flow direction FL of cooling air over combustion liner 10. Outer wall 16 is configured to receive and support other components/features of combustion liner 10, discussed below.

Fuel channel 18 includes first distal end 34, second distal end 36, end face 38, bore 40, and internal geometry 42. First distal end 34 is the aft most end of fuel channel 18, with respect to flow direction FL of cooling air over combustion liner 10. Second distal end 36 is the forward most end of fuel channel 18, with respect to flow direction FL of cooling air over combustion liner 10. End face 38 is an end surface of fuel channel 18 positioned adjacent second distal end 36 of fuel channel 18. Bore 40 is an aperture extending through fuel channel 18 from first distal end 34 to second distal end 36 but bore 40 does not extend through second distal end 36. In the embodiment shown bore 40 has a circular cross-sectional shape, but in another embodiment bore 40 can have any cross-sectional shape. Further, in the embodiment shown, bore 40 has a constant cross-section extending from first distal end 34 to second distal end 36. In another embodiment, bore 40 can taper from first distal end 34 to second distal end 36. In yet another embodiment, bore 40 can taper from second distal end 36 to first distal end 34. Bore 40 is configured to receive fuel and provide a path for the fuel to flow through fuel channel 18 from first distal end 34 to second distal end 36. In the embodiment shown in FIG. 2B, fuel channel 18 includes internal geometry 42 extending from first distal end 34 to second distal end 36. Internal geometry 42 is configured to induce swirling of the fuel flowing through bore 40 of fuel channel 18. In some examples, internal geometry 42 can be a helical groove cut into bore 40 of fuel channel 18, extending from first distal end 34 to second distal end 36 of fuel channel 18. The helical groove causes the flowing fuel to swirl while it flows through bore 40, which increases the atomization and burn performance of the fuel within combustion liner 10. Although shown in FIG. 2B, some embodiments of fuel channel 18 may not include internal geometry 42.

Fuel channel 18 is a feature of combustion liner 10 that is positioned adjacent outer surface 28 of outer wall 16. More specifically, as shown best in FIG. 2A, fuel channel 18 is positioned partially within outer surface 28 of outer wall 16 and partially outside outer surface 28 of outer wall 16. Fuel channel 18 is positioned partially within and partially outside outer surface 28 to pre-heat the fuel flowing through fuel channel 18 while not overheating the fuel flowing through fuel channel 18. The heat produced during combustion of the fuel and air mixture within combustion liner 10 radiates outward and causes the fuel flowing through fuel channel 18 to increase to a desired temperature. If fuel channel 18 were positioned fully within outer wall 16, the fuel flowing through fuel channel 18 could get too hot before entering an interior of combustion liner 10, which could result in negative effects on the performance of gas turbine engine 100 (e.g., vaporization or coking in fuel channel 18). If fuel channel 18 were positioned fully outside outer wall 16, the fuel flowing through fuel channel 18 may not increase to the desired temperature before entering an interior of combustion liner 10. Further, fuel channel 18 being positioned fully outside outer wall 16 could cause an increase in cooling air flow disruption (and a decrease in the cooling of combustion liner 10) due to fuel channel 18 being positioned fully within the cooling air flow volume. As such, positioning fuel channel 18 partially within and partially outside outer surface 28 of outer wall 16 provides pre-heating of the fuel flowing through fuel channel 18 and decreases disruptions in cooling air flow over outer surface 28.

Figure 3:
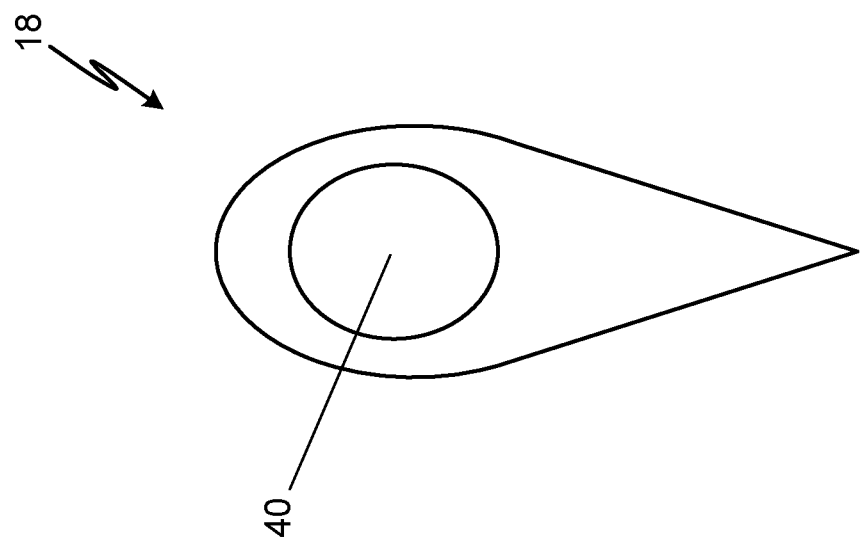
FIG. 3 is a cross-sectional view of an example fuel channel of the monolithic combustion liner taken along section line D-D of FIG. 2B.

Further, fuel channel 18 extends in axial direction AX of combustion liner 10 to reduce cooling air flow disruption. First distal end 34 of fuel channel 18 extends axially outward from first end face 30 of outer wall 16 and through a wall of combustion chamber 12. First distal end 34 of fuel channel 18 is configured to be fluidly coupled to fuel source 44 of gas turbine engine 100, such that first distal end 34 receives fuel from fuel source 44. Fuel source 44 can be any fluid tight vessel that stores a fuel to be used by gas turbine engine 100. In the embodiment shown, the portion of fuel channel 18 extending axially outward from first end face 30 of outer wall 16 is tubular in shape and has a circular cross section. In another embodiment, as shown in FIG. 3, the portion of fuel channel 18 extending axially outward from first end face 30 of outer wall 16 can have a teardrop shaped cross-sectional area, when viewing in axial direction AX. The teardrop shape of the axially extending portion of fuel channel 18 can help decrease cooling air turbulence adjacent the bottom side of fuel channel 18, as the cooling air flows over and past fuel channel 18 and combustion liner 10. More specifically, the teardrop shaped cross section guides the cooling air flow along the outer surface of fuel channel 18 and away from fuel channel 18, decreasing or preventing turbulence adjacent the bottom side of fuel channel 18. In yet other embodiments, the portion of fuel channel 18 extending axially outward from first end face 30 of outer wall 16 can have any cross-sectional shape.

Fuel channel 18 is formed integral with outer surface 28 of combustion liner 10, such that fuel channel 18 is formed as a single piece with outer wall 16. In some examples, fuel channel 18 can be manufactured using an additive manufacturing process, such as powder bed fusion additive manufacturing. The additive manufacturing process can produce all features of fuel channel 18, including internal geometry 42 within bore 40 of fuel channel 18. Further, combustion liner 10 can include a plurality of fuel channels 18 that are equally spaced about a circumference of outer wall 16 of combustion liner 10. In other examples, fuel channels 18 may not be equally spaced about a circumference of outer wall 16 of combustion liner 10. In the example shown in FIG. 1, combustion liner 10 includes twelve fuel channels 18 integrally formed with and spaced about a circumference of outer wall 16 of combustion liner 10. In other examples, combustion liner 10 can include more or fewer than twelve fuel channels 18 integrally formed with and spaced about a circumference of outer wall 16 of combustion liner 10. Fuel channel 18 is configured to receive fuel from fuel source 44 at first distal end 34, flow the fuel through bore 40 from first distal end 34 to second distal end 36, and then flow the fuel into nozzle 20.

As best shown in FIGS. 2B-2C, nozzle 20 is positioned at second distal end 36 of fuel channel 18. More specifically, nozzle 20 is positioned within and extends through second distal end 36 of fuel channel 18. Nozzle 20 is an aperture that extends through second distal end 36 of fuel channel 18, such that nozzle 20 extends from bore 40 to end face 38 of fuel channel 18. Nozzle 20 is configured to fluidly couple bore 40 of fuel channel 18 to an interior of combustion liner 10. More specifically, nozzle 20 is configured to receive the fuel flowing through bore 40, increase the pressure and flow rate of the flowing fuel, and then dispense the fuel into an interior of combustion liner 10. In some examples, nozzle 20 can have a diameter of about 0.016 inches (0.4064 millimeters). In other examples, nozzle 20 can have a diameter of more or less than 0.016 inches. Further, in the described embodiment, nozzle 20 has a circular cross-sectional shape. In another embodiment, nozzle 20 can have any cross-sectional shape. In the embodiment shown, nozzle 20 includes a curved portion, but in another embodiment, nozzle 20 may not include the curved portion, such that nozzle 20 has a straight nozzle configuration. Nozzle 20 is formed integral with fuel channel 18 during the manufacturing process used to produce fuel channel 18 and combustion liner 10. In some examples, combustion liner 10 can include a plurality of nozzles 20 equally spaced about a circumference of outer wall 16 of combustion liner 10. In other examples, nozzles 20 may not be equally spaced about a circumference of outer wall 16 of combustion liner 10. In the example shown in FIG. 1, combustion liner 10 includes twelve nozzles 20 integrally formed with and positioned adjacent each fuel channel 18 of combustion liner 10. In other examples, combustion liner 10 can include more or fewer than twelve fuel nozzles 20 integrally formed with and positioned adjacent each fuel channel 18 of combustion liner 10, depending on the number of fuel channels 18.

Splash plate 22 is positioned adjacent and coupled to fuel channel 18. More specifically, splash plate 22 is spaced from end face 38 of fuel channel 18 by a distance, creating a gap between end face 38 of fuel channel 18 and splash plate 22. Further, splash plate 22 is positioned parallel with end face 38 of fuel channel 18. Splash plate 22 is also axially spaced from nozzle 20 by a distance, creating a gap between nozzle 20 and splash plate 22. Splash plate 22 is a generally flat feature of combustion liner 10 that is offset from and positioned in close relation to nozzle 20 of fuel channel 18. Splash plate 22 is configured to interrupt the flow of fuel dispensing from nozzle 20 before the fuel enters dilution chute 24. More specifically, the fuel dispensing from nozzle 20 contacts splash plate 22 and the dispensing fuel is atomized before the fuel enters dilution chute 24, increasing the burn performance of the fuel within combustion liner 10. In some examples, combustion liner 10 can include a plurality of splash plates 22 equally spaced about a circumference of outer wall 16 of combustion liner 10. In other examples, splash plates 22 may not be equally spaced about a circumference of outer wall 16 of combustion liner 10. In the example shown in FIG. 1, combustion liner 10 includes twelve splash plates 22 integrally formed with and positioned adjacent each fuel channel 18 of combustion liner 10. In other examples, combustion liner 10 can include more or fewer than twelve splash plates 22 integrally formed with and positioned adjacent each fuel channel 18 of combustion liner 10, depending on the number of fuel channels 18.

As shown best in FIG. 2A, dilution chute 24 is positioned adjacent second distal end 36 of fuel channel 18 and adjacent nozzle 20, such that dilution chute 24 is offset from second distal end 36 and nozzle 20 by a distance or gap. Further, dilution chute 24 extends partially within and partially outside outer wall 16 of combustion liner 10. As shown in FIG. 2A, the portion of dilution chute 24 extending outside of outer wall 16 of combustion liner 10 is semi-circular in shape. As shown in FIG. 1, the portion of dilution chute 24 extending within outer wall 16 of combustion liner 10 extends into interior 15 of combustion liner 10 at an acute angle. Dilution chute 24 is configured to receive atomized fuel after the fuel dispensing from nozzle 20 contacts splash plate 22 and then the atomized fuel flows into interior 15 of combustion liner 10. The semi-circular shape of the portion of dilution chute 24 extending outside of outer wall 16 prevents the cooling airflow traversing outer surface 28 of outer wall 16 from interrupting the flow of fuel dispensing from nozzle 20 into dilution chute 24. In other words, the semi-circular shape of dilution chute 24 allows the atomized fuel to enter dilution chute 24 by preventing the cooling airflow traversing outer surface 28 from blowing the atomized fuel spray away from dilution chute 24.

Additionally, dilution chute 24 extends into interior 15 of combustion liner 10 to facilitate the swirling of the fuel and air mixture flowing within interior 15 of combustion liner 10, increasing the burn performance within combustion liner 10. Dilution chute 24 creates turbulence within interior 15 of combustion liner 10, causing the fuel entering interior 15 to sufficiently mix with air entering interior 15 of combustion liner 10. Dilution chute 24 is formed integral with outer wall 16 during the manufacturing process used to produce combustion liner 10. In some examples, combustion liner 10 can include a plurality of dilution chutes 24 equally spaced about a circumference of outer surface 28 of outer wall 16 of combustion liner 10. In other examples, dilution chutes 24 may not be equally spaced about a circumference of outer wall 16. In the example shown in FIG. 1, combustion liner 10 includes twelve dilution chutes 24 integrally formed with and positioned adjacent outer wall 16 of combustion liner 10. In other examples, combustion liner 10 can include more or fewer than twelve dilution chutes 24 integrally formed with and positioned adjacent outer wall 16 of combustion liner 10, depending on the number of fuel channels 18 within combustion liner 10.

As shown best in FIG. 2C, support root 26 is a feature of combustion liner 10 that extends from second distal end 36 of fuel channel 18 to a surface of dilution chute 24, coupling second distal end 36 of fuel channel 18 to dilution chute 24. More specifically, support root 26 extends from end face 38 of fuel channel 18 to splash plate 22, coupling fuel channel 18 to splash plate 22. Further, support root 26 extends from splash plate 22 to dilution chute 24, coupling splash plate 22 to a surface of dilution chute 24. Support root 26 extends generally in axial direction AX and, in some examples, support root 26 can have a generally circular cross-sectional shape when viewing in axial direction AX. In other examples, support root 26 can have any cross-sectional shape. Support root 26 is included as a feature of combustion liner 10 due to the manufacturing process used to produce combustion liner 10. Support root 26 allows combustion liner 10 to be additively manufactured in axial direction AX, providing a contact surface to build upon layer by layer to produce complex geometries such as dilution chute 24, splash plate 22, and nozzle 20. Removal of support root 26 would prevent the specific geometries and positioning of features of combustion liner 10 from being produced using an additive manufacturing process. As such, support root 26 is formed integral with fuel channel 18, splash plate 22, and dilution chute 24 during the manufacturing process used to produce combustion liner 10.

Combustion liner 10 is an additively manufactured component of gas turbine engine 100 that is designed to improve performance of the combustion section of gas turbine engine 100. Combustion liner 10 can be additively manufactured as a unitary single-piece construction, such that the combustion liner is constructed in a single, continuous manufacturing process. In one example, combustion liner 10 can be additively manufactured using a powder bed fusion additive manufacturing process. In other examples, combustion liner 10 can be manufactured using other additive manufacturing processes such as, but not limited to, direct metal laser sintering, electron beam melting, selective heat sintering, selective laser melting, and selective laser sintering. Further, combustion liner 10 can be additively manufactured in axial direction AX to produce complex geometries such as dilution chute 24, splash plate 22, and nozzle 20, without the need for additional supports within combustion liner 10 (as described with reference to support root 26). Additively manufacturing combustion liner 10 in axial direction AX ensures proper tolerancing and concentricity of combustion liner 10 is achieved. In contrast, traditionally manufactured combustion liners are perforated using laser-drilling and brazed or welded together, causing localized distortions due to the introduction of thermal energy into a low thermal mass system. As such, additively manufacturing combustion liner 10 in axial direction AX results in a combustion liner without localized distortions due to secondary joining processes and ensures proper tolerancing and concentricity are achieved. In some examples, combustion liner 10 can be additively manufactured from a nickel-based superalloy to ensure the mechanical and thermal properties of combustion liner 10 can withstand the harsh operating environment within gas turbine engine 100. In some examples, the nickel-based superalloy can be one or more of Hastelloy X and Inconel.

In addition, combustion liner 10 can be additively manufactured to include integral aerodynamic features such as fuel channel 18. Fuel channels 18 are oriented in axial direction AX such that fuel channels 18 are axially parallel with the cooling airflow traversing outer surface 28 of combustion liner 10. The parallel orientation of fuel channels 18 reduces disruptions to the cooling airflow, allowing the cooling air to remove heat from outer wall 16 of combustion liner 10. Further, fuel channels 18 are integrally formed with outer wall 16 such that fuel channels 18 are partially within outer surface 28 and partially outside outer surface 28 to achieve desirable pre-heating of the fuel flowing through fuel channels 18. The positioning and orientation of fuel channels 18 improves burn characteristics of the fuel within combustion liner 10 and improves cooling characteristics of outer surface 28 of combustion liner 10, compared to traditional circular tube fuel manifolds positioned outside combustion liner 10 and coupled to combustion liner 10 through a plurality of brackets secured to outer surface 28 of combustion liner 10. As such, integrally formed fuel channels 18 within combustion liner 10 improve the overall performance characteristics of gas turbine engine 100.

Discussion of Possible Embodiments

The following are non-exclusive descriptions of possible embodiments of the present invention.

A combustion liner for use in a gas turbine engine, the combustion liner comprising: an inner wall, an outer wall, and a dome, wherein the outer wall is spaced radially outward from the inner wall, and wherein the dome extends between and couples the inner wall to the outer wall; a fuel channel formed as a single piece with the outer wall, wherein a first distal end of the fuel channel receives fuel from a fuel source; and a nozzle positioned at a second distal end of the fuel channel, wherein the nozzle is fluidly coupled to the fuel channel.

The combustion liner of the preceding paragraph can optionally include, additionally and/or alternatively, any one or more of the following features, configurations and/or additional components in any combination:

The fuel channel is positioned partially within and partially outside an outer surface of the outer wall, and wherein the fuel channel extends in an axial direction of the combustion liner.

The first distal end of the fuel channel extends axially outward from a first end face of the outer wall.

The portion of the fuel channel extending axially outward from the first end face of the outer wall comprises a teardrop shaped cross sectional area in an axial direction.

The fuel channel comprises internal geometry configured to induce swirling of the fuel flowing through a bore of the fuel channel.

The internal geometry of the fuel channel is a helical groove positioned within the bore of the fuel channel, and wherein the helical groove extends from the first distal end to the second distal end of the fuel channel.

The combustion liner comprises a plurality of fuel channels, and wherein the plurality of fuel channels are equally spaced about a circumference of the outer wall of the combustion liner.

A splash plate coupled to the fuel channel, wherein the splash plate is spaced from and positioned parallel with an end face of the fuel channel.

The splash plate is axially spaced from the nozzle, and wherein the splash plate is configured to interrupt a flow of fuel dispensing from the nozzle.

The combustion liner comprises a plurality of nozzles and a plurality of splash plates, and wherein the plurality of nozzles and the plurality of splash plates are equally spaced about a circumference of the outer wall of the combustion liner.

A dilution chute positioned adjacent the second distal end of the fuel channel and adjacent the nozzle, wherein the dilution chute extends partially within and partially outside the outer wall of the combustion liner.

The combustion liner comprises a plurality of dilution chutes, and wherein the plurality of dilution chutes are equally spaced about a circumference of the outer wall of the combustion liner.

The portion of dilution chute extending outside of the outer wall is semi-circular in shape; and the portion of dilution chute extending within the outer wall extends into an interior of the combustion liner at an acute angle.

A support root extends from the second distal end of the fuel channel to the dilution chute, coupling the second distal end of the fuel channel to the dilution chute.

The combustion liner is of unitary single-piece construction, such that the combustion liner is constructed in a single, continuous manufacturing process.

The combustion liner is constructed from a nickel-based superalloy.

The following are further non-exclusive descriptions of possible embodiments of the present invention.

A method of using a combustion liner in a gas turbine engine, the method comprising: injecting fuel from a fuel source into a fuel channel, wherein the fuel channel is formed as a single piece with an outer wall of the combustion liner; flowing the fuel from a first distal end to a second distal end of the fuel channel, wherein the fuel is pre-heated as the fuel flows through the fuel channel; dispensing the pre-heated fuel through a nozzle into a dilution chute; and flowing the pre-heated fuel through the dilution chute into an interior of the combustion liner.

The method of the preceding paragraph can optionally include, additionally and/or alternatively, any one or more of the following features, configurations and/or additional components:

Dispensing the pre-heated fuel through the nozzle onto a splash plate to atomize the pre-heated fuel before entering the dilution chute.

Inducing swirl, through internal geometry within a bore of the fuel channel, to the fuel as the fuel flows from the first distal end to the second distal end of the fuel channel.

The internal geometry of the fuel channel is a helical groove positioned within the bore of the fuel channel, and wherein the helical groove extends from the first distal end to the second distal end of the fuel channel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment(s) disclosed, but that the invention will include all embodiments falling within the scope of the appended claims.

The invention claimed is:

1. A combustor section for use in a gas turbine engine, the combustor section comprising:
   a combustion chamber;
   a combustion liner that fits within and is secured to the combustion chamber, wherein the combustion liner is spaced radially inside of the combustion chamber; and
   an annular volume between the combustion chamber and the combustion liner, wherein the annular volume is configured to permit cooling air to flow through the annular volume to remove heat from the combustion liner when the gas turbine engine is in operation;
   wherein the combustion liner further comprises:
      an inner wall having a circular cross section extending in an axial direction,
      an outerwall, and
      a dome, wherein the outerwall is spaced radially outward from the inner wall with respect to the axial direction such that the outer wall is concentric about the inner wall, and wherein the dome extends between and couples the inner wall to the outerwall, further wherein the outerwall is exposed to the cooling air flowing in the axial direction in the annular volume between the combustion chamber and the combustion liner when the gas turbine engine is in operation; and
      a fuel channel formed as a single piece within the outerwall, wherein a first distal end of the fuel channel receives fuel from a fuel source and a second distal end of the fuel channel is fluidly coupled to a fuel nozzle, wherein the fuel nozzle is configured to inject fuel between the inner wall and the outer wall;
   wherein the fuel channel is positioned partially within the outerwall and partially outside an outer surface of the outerwall between the outerwall and the annular volume such that the fuel channel extends in the axial direction of the combustion liner parallel to the flow of the cooling air in the annular volume and is partially exposed to the cooling air flowing over and past the fuel channel and combustion liner in the annular volume between the combustion chamber and the combustion liner when the gas turbine engine is in operation.

2. The combustor section of claim 1, wherein the first distal end of the fuel channel extends axially outward from a first end face of the outer wall.

3. The combustor section of claim 2, wherein the first distal end of the fuel channel extending axially outward from the first end face of the outerwall comprises a teardrop shaped cross sectional area in the axial direction.

4. The combustor section of claim 1, wherein the fuel channel comprises internal geometry configured to induce swirling of the fuel flowing through a bore of the fuel channel.

5. The combustor section of claim 4, wherein the internal geometry of the fuel channel is a helical groove positioned within the bore of the fuel channel, and wherein the helical groove extends from the first distal end to the second distal end of the fuel channel.

6. The combustor section of claim 1, wherein the combustion liner comprises a plurality of fuel channels of the fuel channel, and wherein the plurality of fuel channels are equally spaced about a circumference of the outerwall of the combustion liner.

7. The combustor section of claim 1 further comprising a splash plate coupled to the fuel channel, wherein the splash plate is spaced from and positioned parallel with an end face of the fuel channel.

8. The combustor section of claim 7, wherein the splash plate is axially spaced from the fuel nozzle, and wherein the splash plate is configured to interrupt a flow of the fuel dispensing from the fuel nozzle.

9. The combustor section of claim 1, wherein the combustion liner comprises a plurality of fuel nozzles of the fuel nozzle and a plurality of splash plates, and wherein the plurality of fuel nozzles and the plurality of splash plates are equally spaced about a circumference of the outer wall of the combustion liner.

10. The combustor section of claim 1 further comprising a dilution chute positioned adjacent the second distal end of the fuel channel and adjacent the fuel nozzle, wherein the dilution chute extends partially within and partially outside the outer wall of the combustion liner.

11. The combustor section of claim 10, wherein the combustion liner comprises a plurality of dilution chutes of the dilution chute, and wherein the plurality of dilution chutes are equally spaced about a circumference of the outer wall of the combustion liner.

12. The combustor section of claim 10, wherein:
a portion of the dilution chute extending outside of the outer wall is semi-circular in shape; and
a portion of the dilution chute extending within the outer wall extends into an interior of the combustion liner at an acute angle.

13. The combustor section of claim 10, wherein a support root extends from the second distal end of the fuel channel to the dilution chute, coupling the second distal end of the fuel channel to the dilution chute.

14. The combustor section of claim 1, wherein the combustion liner is of unitary single-piece construction, such that the combustion liner is constructed in a single, continuous manufacturing process.

15. The combustor section of claim 14, wherein the combustion liner is constructed from a nickel-based superalloy.

16. A method of using a combustion liner in a gas turbine engine, the method comprising:
injecting fuel from a fuel source into a fuel channel, wherein the fuel channel is formed as a single piece within an outer wall of the combustion liner;
flowing cooling air through an annular volume between an outerwall of the combustor liner and a combustion chamber spaced radially outside of the combustor liner;
flowing the fuel from a first distal end to a second distal end of the fuel channel, wherein the fuel is pre-heated as the fuel flows through the fuel channel, wherein the fuel channel is positioned partially within the outer wall and partially outside an outer surface of the outer wall between the outer wall and the annular volume such that the fuel channel extend in an axial direction of the combustion liner parallel to a flow of cooling air and is partially exposed to the cooling air flowing over and past the fuel channel and combustion liner through the annular volume between the outer wall of the combustor liner and the combustion chamber spaced radially outside of the combustor liner;
dispensing the pre-heated fuel through a fuel nozzle into a dilution chute such that the pre-heated fuel is injected between the outer wall and an inner wall, wherein the outer wall is spaced radially outward from the inner wall with respect to the axial direction such that the outer wall is concentric about the inner wall, and wherein a dome extends between and couples the inner wall to the outer wall; and
flowing the pre-heated fuel through the dilution chute into an interior of the combustion liner.

17. The method of claim 16 and further comprising dispensing the pre-heated fuel through the fuel nozzle onto a splash plate to atomize the pre-heated fuel before entering the dilution chute.

18. The method of claim 16 and further comprising inducing swirl, through internal geometry within a bore of the fuel channel, to the fuel as the fuel flows from the first distal end to the second distal end of the fuel channel.

19. The method of claim 18, wherein the internal geometry of the fuel channel is a helical groove positioned within the bore of the fuel channel, and wherein the helical groove extends from the first distal end to the second distal end of the fuel channel.

* * * * *